United States Patent [19]
Hermele et al.

[11] Patent Number: 5,686,507
[45] Date of Patent: Nov. 11, 1997

[54] HIGH PROFILE NON-SKID DECK COATING COMPOSITION

[75] Inventors: Jules J. Hermele, Lafayette; David P. Robinson, Whippany, both of N.J.

[73] Assignee: The Morgan Crucible Company p.l.c., Berkshire, United Kingdom

[21] Appl. No.: 285,043

[22] Filed: Aug. 3, 1994

Related U.S. Application Data

[63] Continuation-in-part of Ser. No. 102,001, Aug. 4, 1993, abandoned.

[51] Int. Cl.⁶ ........................................ C08J 5/14
[52] U.S. Cl. .................. 523/153; 523/149; 524/411; 524/430; 524/513; 524/514; 428/395; 525/403; 525/408
[58] Field of Search .................. 523/149, 153; 524/441, 430, 513, 514; 428/395; 525/403, 408

[56] References Cited

U.S. PATENT DOCUMENTS

| | | | |
|---|---|---|---|
| 4,316,404 | 2/1982 | Medlin | 89/36.08 |
| 4,320,823 | 3/1982 | Covaleski | 192/107 M |
| 4,404,889 | 9/1983 | Miguel | 89/36.02 |
| 4,760,103 | 7/1988 | Kraft | 523/150 |
| 4,937,127 | 6/1990 | Haenggi et al. | 428/148 |
| 5,094,902 | 3/1992 | Haenggi et al. | 428/150 |
| 5,124,178 | 6/1992 | Haenggi et al. | 427/204 |
| 5,139,845 | 8/1992 | Beckerman | 428/117 |
| 5,217,778 | 6/1993 | LaCasse | 428/64 |

FOREIGN PATENT DOCUMENTS

| | | |
|---|---|---|
| 2-178461 | 7/1990 | Japan . |
| 2000517 | 1/1979 | United Kingdom . |
| 2129006 | 5/1984 | United Kingdom . |

*Primary Examiner*—Paul R. Michl
*Assistant Examiner*—John J. Guarriello
*Attorney, Agent, or Firm*—Dean W. Russell; Bruce D. Gray; Kilpatrick Stockton LLP

[57] ABSTRACT

High friction coatings, compositions for producing such coatings, and non-skid coatings for ships and decks are disclosed. Included are compositions comprising a curable resin, a filler, and aramid in the form of fibers or flakes.

24 Claims, 1 Drawing Sheet

HIGH PROFILE NON-SKID DECK COATING COMPOSITION

This application is a continuation-in-part of application Ser. No. 08/102,001, now abandoned, filed Aug. 4, 1993, entitled "High Profile Non-Skid Coating Composition."

TECHNICAL FIELD

This invention relates to high friction coatings, to compositions for producing such high friction coatings, and more particularly, although not exclusively, to highly abrasion resistant, high impact resistant, non-sparking, high-profile, non-skid coatings for ships and decks.

BACKGROUND OF THE INVENTION

Non-skid coatings for ships and decks are used to prevent sliding and movement of aircraft, personnel, and machinery. Non-skid coatings can be applied by roller or spray and provide a surface with a high degree of strength and impact resistance. These coatings have the ability to withstand large temperature extremes during application and wear. A typical requirement of such a coating is to withstand 5,000 to 15,000 landings and tail hook impacts of jet airplanes landing on carrier decks. Present systems employ the use of epoxy resins with various fillers to provide a surface which is non-skid in nature and abrasion resistant.

Application of the known non-skid coatings is principally performed by using a smooth phenolic core roller. This special roller without any hair is used to create a non-skid surface by pulling upon the coating during application and creating ridges and troughs when rolled. The surfaces of these ridges and troughs are generally smooth. This surface profile combined with the characteristics of the coating materials provides a non-slip surface.

Generally, in known non-skid coatings, fine grades of silica are used as fillers comprising up to 60% by weight of the coating composition. The silica may become a health hazard during removal by shot blasting. Such shot blasting creates airborne silica which has been implicated as a health hazard in other contexts.

U.S. Pat. No. 4,760,103 (Kraft) discloses a non-skid coating formulation comprising resins, pigments, solvents and aggregates and in which fiber fillers may be included to aid in forming a coarse structure. The only fiber filler disclosed is a polypropylene having average fiber length 0.8–15 millimeters and average fiber diameter 20–40 μm. The fiber filler is included in an amount of 0.4 wt %.

In U.S. Pat. No. 4,404,889 to Miguel, a composite armor is disclosed containing Kevlar (aramid fiber) fabric which is sandwiched between layers of steel armor plate. This is used as a composition armor for armored vehicles. The arrangement and type of material includes balsa wood or elastomer containing microspheres which help in transmitting shock waves. The use of a composite containing aramid fabric reduces shock effects.

In U.S. Pat. No. 4,316,404 to Medlin, it is disclosed that Kevlar fabric attached to rigid woven polyglass provides a lightweight armor for vehicles.

In Japanese Patent JP 2178461 it is disclosed that compression molded floor panels can be made by using thermosetting resins such as polyesters or epoxies. The mixtures disclosed use high concentrations of fibrous aggregates such as chopped glass strand, carbon fiber, nylon fiber, etc. This is blended with a porous powder such as zeolite or bentonite. It recommends that these panels can be used for bathrooms.

Japanese Patent Application Kokai: Sho 63-179978 discloses a composition for traffic paint containing fibers from 0.2 to 8 parts by weight from a group composed of aramid fibers, carbon fibers, and glass fibers per 100 parts by weight of traffic paint. Such paints are preferably heat melt applied because of the high level of fibers employed owing to increased viscosity. The compositions described have uneven appearances.

Although various types of fillers are disclosed for inclusion in base compositions for composite armor, traffic paints, molded compositions or coatings, the final compositions do not exhibit a ridged tough non-skid profile.

Due to the health hazards of respirable silica the final compositions of known deck coating compositions are hazardous when worn or removed and do not posses optimum high profile non-skid with high coefficients of friction. Consequently, the search continues for non-skid coatings which can be applied without melting or sagging on hot decks, possess high coefficients of friction and are chemically safe while performing under extreme impacts and temperature ranges.

SUMMARY OF THE INVENTION

The present invention provides a high friction coating composition comprising a curable resin, a filler, and aramid in the form of fibers or flakes, the aramid being present in an amount in the range 0.01 to 1%, preferably 0.01 to 0.2%, by weight.

The invention also provides coatings made from such compositions and having a textured surface profile.

Preferably the filler comprises abrasion resistant materials having a low or zero content of free crystalline silica. Suitable abrasion resistant materials include aluminum oxide, amorphous glass, garnet, and more preferably nepheline syenite. (Nepheline syenite is anhydrous sodium potassium aluminum silicate. It is a complex of silicates in which the alkali ions are completely fixed in the crystal lattice and tied up chemically. It is of igneous nature and contains no free silica or quartz.)

Various other mineral fillers may be included in the composition such as, e.g., barium sulfate, talc, wollastonite.

For anti-spark properties metallic or other conductive particles may be included, e.g. of aluminum and/or carbon black. For aircraft landing areas aluminum is a preferred filler material since in addition to its anti-spark character it also has the beneficial property of being less abrasive than other filler materials to the steel cables that are used on aircraft carriers to capture the tailhook of incoming aircraft.

Other constituents, e.g. processing additives and product modifiers, may be included.

These compositions when rolled create a surface profile with enhanced non-skid properties and provide uniform parallel rows of ridges and furrows having undulations along their length which provide enhanced and improved non-skid properties over the current art.

The sprayed compositions provide an undulating surface of high coefficient of friction.

The invention discloses a unique surface profile which can be applied to hot decks. The final cured composition is silica free and provides a coefficient of friction greater than 0.7.

Another advantage to the composition is the high degree of strength. The coating can withstand severe impacts of cables, tailhooks, and airplanes.

The composition provides a profile with high chemical and mechanical bonding while creating a unique undulating surface texture with high coefficient of friction. It is surmised that the aramid fiber or flake stabilizes the textured surface profile and is sufficiently tough to withstand abrasion in use. The combination of rolled ridges and troughs with undulations along the ridges provides an extremely skid resistant high friction surface.

DETAILED DESCRIPTION OF THE INVENTION

Figure 1:
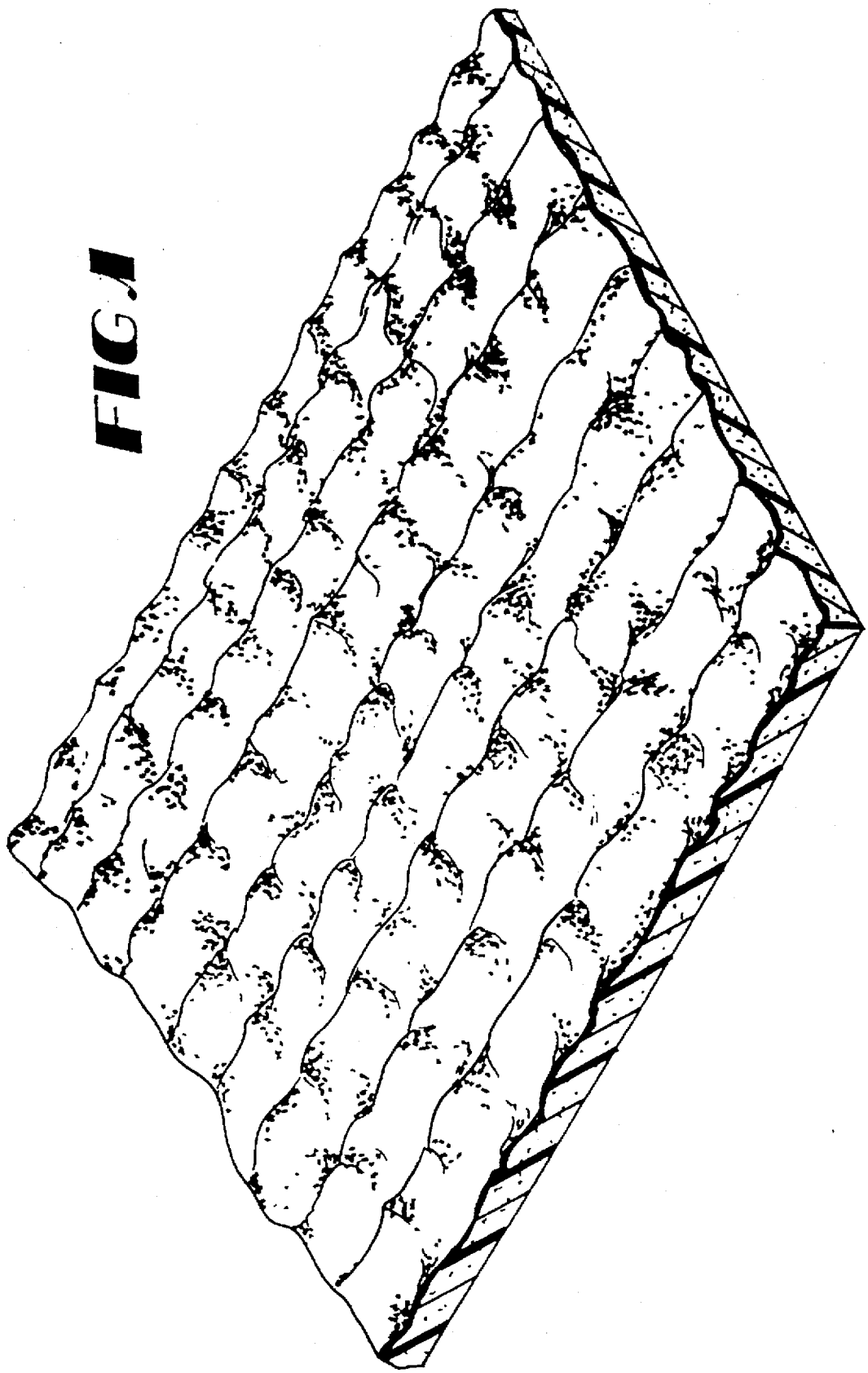
FIG. 1 shows a schematic view of the undulating surface profile created by the coating compositions of the present invention when applied by roller.

The composition of the present invention includes a base composition which may for example comprise a mixture of epoxy resins, amine hardeners, pigment for color, and additives for defoaming. Typical base compositions are well known in the art for producing epoxy compounds. While a particular combination of components will be discussed, it will be understood by those skilled in the art that various combinations of materials, ingredients, and additives can be used to produce a base composition.

For producing a high profile non-skid coating compound, a key property is the viscosity and degree of tackiness to the phenolic core roller. Generally, viscosities greater than 30,000 centipoise are common, with such viscosities achieved by the controlled addition of fillers.

A typical composition in accordance with the invention includes an admixture of aramid fibers and nepheline syenite in a ratio of 1:10 to 1:1000 by weight respectively. The nepheline syenite has a size of 2 to 20 microns, preferably 2 to 7 microns. The aramid fiber and/or flake has a length of 0.8 to 4 millimeter and a diameter of 1 to 20 microns, preferably 10 to 12 microns. Generally, the shorter fiber lengths (such as 0.8 to 2 millimeters) are preferred as furrow and ridge depth can be more easily controlled. Generally, about 5 to 25% by weight of the final composition is the nepheline syenite/aramid fiber admixture, with 10 to 20% preferred. It has also been found that aramid flake may be combined with the fiber to adjust the aramid fibers rheological behaviour. The disclosed invention may use aramid flake in the composition to also vary overall aramid concentration.

Other materials that may be used in place of nepheline syenite as an abrasion resistant filler material include garnet, amorphous glass, aluminum oxide, and fused mullite. All of these materials have the requisite degree of hardness and appropriate oil absorption characteristics to provide a workable composition.

Another advantage to the invention is that inclusion of aramid fiber and/or flake allows less settling of heavy non-skid aggregates in the composition. The admixture provides unique rolling application properties and provides uniform furrows or troughs associates with the way it rolls during application. Generally, other mineral fillers should be from 5 to 30% by weight of the final non-skid composition.

Utilizing aramid fibers and nepheline syenite provides enhanced physical properties of the cured composition.

Typical formulations in accordance with the invention are disclosed in Table 1 which shows for each of eight compositions the proportions of each component provided in approximate weight %. Where Table 1 refers to "Mineral fillers" the fillers used were barium sulfate and wollastonite.

Utilizing the aramid in the coating provides indentations in the ridged furrows or troughs during application providing a higher degree of anti-skid and higher coefficient of friction. The thixotropic nature of the aramid fibers also helps to improve shelf life and storage stability of the coating. The compositions of Table 1 have excellent shelf life compared to coatings containing other naturally occurring fillers.

The optimum level of aramid fibers in the final composition is in the range between 0.01 and 1%, preferably 0.01 to 0.2% with about 0.10% being preferred. Levels outside this range result in stickiness or tackiness while rolling. Higher levels of fiber completely destroy the furrows and ridges and subsequently reduce friction.

The proper choice of non-skid aggregates is important to the overall characteristics of the high profile non-skid coating. Aggregates which are hard or soft, or sparking have influence on the areas of placement of shipboard coatings. In Table 1 Compositions 3–5 incorporate large amounts of aluminum granules which render the coating produced electrically conductive and so anti-sparking. These compositions incorporating aluminum granules also exhibit low abrasive character to the steel cables that are used on aircraft carriers to capture the tailhook of incoming aircraft and accordingly are suitable for use in aircraft landing areas.

Compositions 1 and 3–8 are two-part compositions whereas Composition 2 is a one-part composition.

Compositions 1–7 are rollable compositions whereas Composition 8 is a sprayable composition.

Another advantage of the present invention is its improved impact resistance. The higher strength of the aramid fibers improves the coating's ability to withstand impacts. Incorporation of aramid fiber improves the shape of the ridges and troughs created by core roller application. The invention does not sag or change profile after application at high deck temperatures. The level of aramid used provides undulations in the ridges and troughs which increase the coefficient of friction. Increasing the levels of aramid fibers beyond 0.2% stops the undulations and destroys the non-skid character of the coatings.

The inventive composition is manufactured using conventional high speed dispersion equipment and/or paste type putty mixers. For example to produce Composition 1 of Table 1, the epoxy resin is first charged to the mixing tank which may be made of mild steel or stainless steel. The other ingredients such as pigments, defoamers, aramid fibers, nepheline syenite and mineral fillers are then added and dispersed well. The aggregates are then mixed into the composition until the final viscosity is attained. Where it is desired to make the composition in different colors, various colors of tints can be added. Where it is desired to produce anti-spark non-skid it is necessary to replace the aluminum oxide with aluminum granules and/or glass aggregates.

FIG. 1 shows schematically the nature of the coating surface obtained when the compositions of the present invention are rolled. Ridges are shown having undulations along their length. To the inventor's knowledge this undulating profile has not been shown by any previous high friction coating.

While this invention is discussed above in relation to a non-skid coating material including a plurality of additives included therein, it will be understood by those skilled in the art that any changes in the choice or quantity of the base composition can be made without varying from the scope of the present invention.

TABLE 1

| | Composition → | | | | | | | |
|---|---|---|---|---|---|---|---|---|
| | 1 | 2 | 3 | 4 | 5 | 6 | 7 | 8 |
| Part A | | | | | | | | |
| Epoxy Resins | 12 | | 16.4 | 10 | 13 | 8.5 | 12 | 13.2 |
| Epoxy ester/alkyd resin | | 21.5 | | | | | | |
| Hydrocarbon solvents | | | | 14 | 4.5 | 12 | 7 | 9 |
| Xylene/aromatic Naphtha | | 9 | | | | | | |
| Iron oxide pigment | | | 1.5 | | | | | |
| Titanium dioxide pigment | 5 | 7 | | 2 | 1.5 | 1 | 1.5 | 1 |
| Carbon black | | | | 0.3 | 0.3 | 0.3 | 0.3 | 0.3 |
| Aluminium granules | | | 37.4 | 32 | 30 | | | |
| Aluminium Oxide | 40 | 11 | 14 | | | 49 | 41 | 47.6 |
| Amorphous Glass | | 24 | | | | | | |
| Garnet | | 23 | | | | | | |
| Nepheline Syenite | 18 | | | 23 | 8.5 | 15 | 11 | 18 |
| Mineral fillers | 18 | 3.5 | 22.7 | 10.7 | 34.1 | 7.7 | 19.1 | 2.3 |
| Aramid fibre or Flake | 0.1 | 0.02 | 0.1 | 0.1 | 0.1 | 0.1 | 0.1 | 0.1 |
| Defoamers & Additives | 1 | 1 | 1.4 | 1.4 | 1 | 1.4 | 1 | 0.8 |
| Part B | | | | | | | | |
| Amido amine | | | 3 | | 3 | | 3 | |
| Aliphatic polyamine | | | | 1 | | 0.8 | | 1.2 |
| Dimethyl amino methyl phenol | | | | 0.3 | | 0.2 | | |
| Polyamide Resin | 6 | | 3.5 | 5.2 | 4 | 4 | 4 | 6.5 |
| Total | 100.1 | 100.02 | 100 | 100 | 100 | 100 | 100 | 100 |

We claim:

1. A non-skid flooring composition consisting essentially of materials lacking crystalline silica, such materials comprising a mixture of a curable resin, a filler, and aramid in the form of fibers or flakes, the aramid being present in an amount in the range of 0.01 to 1% by weight based upon the total composition, wherein when said composition is cured it forms a surface having a coefficient of friction greater than 0.7.

2. A composition as claimed in claim 1 in which the aramid fiber has an average length of 0.8 to 4 millimeters and an average diameter of 10–12 µm.

3. A composition as claimed in claim 1 in which the materials include an abrasion resistant material selected from the group consisting of nepheline syenite, garnet, amorphous glass, aluminum oxide and mixtures thereof.

4. A composition as claimed in claim 3 in which the abrasion resistant material is nepheline syenite having a mean particle size of 2–7 µm.

5. A composition as claimed in claim 1 in which the curable resin is an epoxy resin.

6. A composition as claimed in claim 1 in which the filler comprises electrically conductive material.

7. A composition as claimed in claim 6 in which the electrically conductive material comprises aluminum.

8. A composition as claimed in claim 1, curable at temperatures between 50° F. and 120° F., having a viscosity in the range 5,000–100,000 centipoises, the curable resin comprising an epoxy/polyamid resin, the aramid fiber or flake having an average length of 0.8 to 4 millimeters, and an average diameter of 1–20 µm, the filler comprising nepheline syenite having a mean particle size of 2–20 µm, the aramid and nepheline syenite being present in the ratio from about 1:10 to 1:1000 parts by weight, the total amount of aramid and nepheline syenite comprising 5–25% by weight of the composition.

9. A composition as claimed in claim 1 in which the materials include an abrasion resistant material which comprises 8.5–65.6% by weight of the composition and mineral fillers in the range 2.3–34.1% by weight of the composition.

10. A composition as claimed in claim 7 in which the aluminum is in the form of granules and comprises 30–37.4% by weight of the composition.

11. A composition as claimed in claim 1 in which the composition is a two-part composition comprising a first part and a second part which parts are mixed in use, the first part containing epoxy resin in the amount 8.5–16.4% by weight of the composition and the second part comprising polyamide resin in the amount 3.5–6.5% by weight of the composition.

12. A composition as claimed in claim 1 and which is sprayable.

13. A non-skid textured flooring surface coating consisting essentially of materials lacking crystalline silica, such materials comprising a rolled, cured mixture comprising a curable resin, a filler, and aramid in the form of fibers and flakes, the aramid being present in an amount in the range 0.01 to 1% by weight based upon the total mixture, wherein said coating forms a surface having a coefficient of friction greater than 0.7.

14. A composition as claimed in claim 13 in which the aramid fiber has an average length of 0.8 to 4 millimeters and an average diameter of 10–12 µm.

15. A composition as claimed in claim 13 in which the materials include an abrasion resistant material selected from the group consisting of nepheline syenite, garnet, amorphous glass, aluminum oxide and mixtures thereof.

16. A composition as claimed in claim 15 in which the abrasion resistant material is nepheline syenite having a mean particle size of 2–7 µm.

17. A composition as claimed in claim 13 in which the composition is a two-part composition comprising a first part and a second part which parts are mixed in use, the first part containing epoxy resin in the mount 8.5–16.4% by weight of the composition and the second part comprising polyamide resin in the amount 3.5–6.5% by weight of the composition.

18. A composition as claimed in claim 13 in which the materials include an abrasion resistant material which comprises 8.5–65.6% by weight of the coating composition and mineral fillers in the range 2.3–34.1% by weight of the composition.

19. A flooring composition consisting essentially of materials lacking crystalline silica, such materials consisting essentially of a mixture of:
 a. curable resin;
 b. filler; and
 c. aramid in the form of fibers or flakes, the aramid being present in an amount in the range 0.01 to 1% by weight, based upon the total composition, wherein said flooring composition forms a surface having a coefficient of friction greater than 0.7.

20. A composition as claimed in claim 19 having an undulating finish, and in which the filler includes an abrasion resistant material selected from the group consisting of nepheline syenite, garnet, amorphous glass, aluminum oxide and mixtures thereof.

21. A non-skid textured flooring surface coating consisting essentially of materials lacking crystalline silica, such materials comprising a sprayed, cured mixture comprising a curable resin, a filler consisting essentially of materials lacking crystalline silica, and aramid in the form of fibers and flakes, the aramid being present in an amount in the range 0.01 to 1% by weight based upon the total mixture, wherein said coating forms a surface having an undulating profile and a coefficient of friction greater than 0.7.

22. The composition as claimed in claim 8, wherein said viscosity is in the range of 25,000–50,000 centipoises.

23. The composition as claimed in claim 8, wherein said aramid fibers or flakes have an average length of 0.8 to 2 millimeters and an average diameter of 10–12 µm.

24. The composition as claimed in claim 8, wherein said nepheline syenite has a mean particle size of 2–7 µm.

* * * * *